United States Patent
Anazawa et al.

(10) Patent No.: US 12,538,052 B2
(45) Date of Patent: Jan. 27, 2026

(54) OPTICAL TRANSPORT SYSTEM, ORCHESTRATOR, CONTROL METHOD, AND STORAGE MEDIUM OF CONTROL PROGRAM

(71) Applicant: NTT, Inc., Tokyo (JP)

(72) Inventors: Kazuya Anazawa, Musashino (JP); Toru Mano, Musashino (JP); Takeru Inoue, Musashino (JP); Hideki Nishizawa, Musashino (JP)

(73) Assignee: NTT, Inc., Tokyo (JP)

( * ) Notice: Subject to any disclaimer, the term of this patent is extended or adjusted under 35 U.S.C. 154(b) by 281 days.

(21) Appl. No.: 18/271,572

(22) PCT Filed: Jan. 12, 2021

(86) PCT No.: PCT/JP2021/000639
§ 371 (c)(1),
(2) Date: Jul. 10, 2023

(87) PCT Pub. No.: WO2022/153353
PCT Pub. Date: Jul. 21, 2022

(65) Prior Publication Data
US 2023/0412950 A1    Dec. 21, 2023

(51) Int. Cl.
*H04Q 11/00*    (2006.01)
*H04J 14/02*    (2006.01)
*H04L 45/42*    (2022.01)

(52) U.S. Cl.
CPC ...... *H04Q 11/0062* (2013.01); *H04J 14/0267* (2013.01); *H04J 14/02862* (2023.08);
(Continued)

(58) Field of Classification Search
None
See application file for complete search history.

(56) References Cited

U.S. PATENT DOCUMENTS 10,587,339 B1 *   3/2020   Al Sayeed ............. H04B 10/70
11,196,505 B2 *  12/2021   Yilmaz ................ H04B 10/296
(Continued)

FOREIGN PATENT DOCUMENTS

JP    2012-015668    1/2012
JP    2014-176027    9/2014
(Continued)

OTHER PUBLICATIONS

Liu et al: "Open Flow-Based Wavelength Path Control in Transparent Optical Networks: a Proof-of-Concept Demonstration," ECOC 2011—37th European Conference and Exhibition on Optical Communication, Final Program, Geneva Switzerland, Sep. 18-22, 2011, pp. 1-3 (Year: 2011).*

(Continued)

*Primary Examiner* — Li Liu
(74) *Attorney, Agent, or Firm* — Fish & Richardson P.C.

(57) ABSTRACT

An orchestrator includes: a communication request reception unit that receives a communication requirement from a first computer; an optical transport NW design unit that determines an optical path to be used for communication based on the communication requirement and a state of an optical transport path of an optical transport network and calculates setting information to be set to an optical network device of each of a plurality of nodes to construct the optical path; a result output/transmission unit that transmits the setting information to the optical network device to each of the plurality of nodes; and an ACK transmission unit that transmits the setting completion notification to the first computer after receiving a setting completion response of the setting information from the plurality of nodes.

5 Claims, 9 Drawing Sheets

(52) U.S. Cl.
CPC ...... *H04L 45/42* (2013.01); *H04Q 2011/0073* (2013.01); *H04Q 2011/0083* (2013.01)

(56) References Cited

U.S. PATENT DOCUMENTS

| | | | | |
|---|---|---|---|---|
| 2006/0104297 | A1* | 5/2006 | Buyukkoc | H04L 45/50 370/409 |
| 2014/0328587 | A1* | 11/2014 | Magri | H04J 14/0257 398/34 |
| 2016/0182146 | A1* | 6/2016 | Schmidtke | H04J 14/0223 398/2 |
| 2019/0109638 | A1* | 4/2019 | Yilmaz | H04B 10/0791 |
| 2019/0149896 | A1* | 5/2019 | Grammel | H04L 41/0816 398/3 |
| 2021/0314067 | A1 | 10/2021 | Inui et al. | |
| 2021/0352386 | A1 | 11/2021 | Takeshita et al. | |
| 2022/0239376 | A1* | 7/2022 | Ito | H04B 10/501 |

FOREIGN PATENT DOCUMENTS

| | | |
|---|---|---|
| WO | WO 2017/033223 | 3/2017 |
| WO | WO 2017/145967 | 12/2018 |
| WO | WO 2020/031514 | 2/2020 |

OTHER PUBLICATIONS

Li et al: "tSDX; Enabling Impairment-Aware All-Optical Inter-Domain Exchange," Journal of Lightwave Technology, Jan. 2018, 36(1), pp. 142-154 (Year: 2018).*

Ferrari et al., "GNPy: an open source application for physical layer aware open optical networks," Journal of Optical Communications and Networking, Jun. 2020, 12(6):C31-C40, 10 pages.

Jinno et al., "Distance-Adaptive Spectrum Resource Allocation in Spectrum-Sliced Elastic Optical Path Network," IEEE Communications Magazine, Aug. 2010, 48(8):138-145, 8 pages.

Jinno et al., "Multiflow Optical Transponder for Efficient Multilayer Optical Networking," IEEE Communications Magazine, May 2012, 50(5):56-65, 10 pages.

Lopez et al., "Enabling fully programmable transponder white boxes [Invited]," Journal of Optical Communications and Networking, Feb. 2020, 12(2):A214-A223, 10 pages.

Lu et al., "Highly Efficient Data Migration and Backup for Big Data Applications in Elastic Optical Inter-Data-Center Networks," IEEE Network, Sep./Oct. 2015, 29(5):36-42, 7 pages.

Newland et al., "Open optical communication systems at a hyperscale operator [Invited]," Journal of Optical Communications and Networking, Jun. 2020, 12(6):C50-C57, 8 pages.

Sasai et al., "Simultaneous Detection of Anomaly Points and Fiber types in Multi-span Transmission Links Only by Receiver-side Digital Signal Processing," Optical Fiber Communication Conference (OFC) 2020, San Diego, CA, USA, Mar. 8-12, 2020, 3 pages.

Soumplis et al., "Multi-Period Planning With Actual Physical and Traffic Conditions," J. Opt. Commun. Netw., Jan. 2018, 10(1):A144-A153, 10 pages.

Li et al., "tSDX; Enabling Impairment-Aware All-Optical Inter-Domain Exchange," Journal of Lightwave Technology, Jan. 2018, 36(1):142-154.

Liu et al., "OpenFlow-Based Wavelength Path Control in Transparent Optical Networks: a Proof-of-Concept Demonstration," ECOC 2011—37th European Conference and Exhibition on Optical Communication, Final Program, Geneva Switzerland, Sep. 18-22, 2011, 3 pages.

Lopez et al., "The Role of SDN in Application Centric IP and Optical Networks," Paper, Presented at the 2016 European Conference on Networks and Communications (EuCNC), Athens, Greece, Jun. 27-30, 2016, 5 pages.

Rozic et al., "A Dynamic Multi-Layer Resource Allocation and Optimization Framework in Application-Centric Networks," Journal of Lightwave Technology, Oct. 2018, 36(20):4908-4914.

\* cited by examiner

OPTICAL TRANSPORT SYSTEM, ORCHESTRATOR, CONTROL METHOD, AND STORAGE MEDIUM OF CONTROL PROGRAM

CROSS-REFERENCE TO RELATED APPLICATIONS

This application is a National Stage application under 35 U.S.C. § 371 of International Application No. PCT/JP2021/000639, having an International Filing Date of Jan. 12, 2021, the disclosure of which is considered part of the disclosure of this application, and is incorporated by reference in its entirety into this application.

TECHNICAL FIELD

The present invention relates to an optical transport system, an orchestrator, a control method, and a control program.

BACKGROUND ART

With the spread of the fifth generation communication system, it is expected to develop carrier edge computing that performs high-load data processing, and it is expected that communication requests having various communication requirements will occur between geographically dispersed computers. Therefore, a technology is required that is capable of automatically setting and controlling an optical transport network to an optimal configuration according to a communication requirement from a computer.

On the other hand, in recent years, with an increase in performance of a digital signal processing circuit (DSP) for optical transport, setting parameters related to transmission performance tend to increase, and transmission modes tend to be diversified. In this regard, an application programming interface (API) called a transponder abstraction interface (TAI) has been proposed as a technology for performing setting and control of an optical transport network independently of a vendor. In addition, a technique for selecting an optimum transmission mode from transmission modes determined by a combination of a plurality of parameters related to transmission performance has been proposed.

CITATION LIST

Patent Literature

Patent Literature 1: WO2020/031514 A1

Non Patent Literature

Non Patent Literature 1: M. Jinno, and 6 others, "Distance-adaptive spectrum resource allocation in spectrum-sliced elastic optical path network", in IEEE Communications Magazine, vol. 48, no. 8, 2010, p. 138-p. 145

SUMMARY OF INVENTION

Technical Problem

However, in the conventional techniques disclosed in Patent Literature 1 and Non Patent Literature 1, it is not possible to optimally control an optical transport network of a lower layer automatically on the basis of a communication requirement from a computer located in an upper layer, and it is therefore necessary to manually grasp a state of an optical transport path and set and control the optical transport network.

The present invention has been made in view of the above circumstances, and an object of the present invention is to provide a technology capable of optimally controlling an optical transport network automatically according to communication requirements from geographically dispersed computers without manual operation.

Solution to Problem

An optical transport system according to an aspect of the present invention is an optical transport system including: a plurality of nodes constituting an optical transport network; a first computer and a second computer that perform communication via the optical transport network; and an orchestrator connected to the plurality of nodes and the first computer and the second computer, in which the first computer includes a transmission unit that transmits a communication requirement related to communication with the second computer to the orchestrator, and a reception unit that receives a setting completion notification of an optical path constructed in the optical transport network from the orchestrator, and the orchestrator includes a reception unit that receives the communication requirement from the first computer, a calculation unit that determines an optical path to be used for the communication based on the communication requirement and a state of an optical transport path of the optical transport network, and calculates setting information to be set to an optical network device of each of the plurality of nodes to construct the optical path, a transmission unit that transmits the setting information to the optical network device to each of the plurality of nodes, and a transmission unit that transmits the setting completion notification to the first computer after receiving a setting completion response of the setting information from the plurality of nodes, each of the plurality of nodes includes a measurement unit that measures the state of the optical transport path of the optical transport network and transmits the state to the orchestrator, a reception unit that receives the setting information to the optical network device of a local node from the orchestrator, a setting unit that sets the setting information to the optical network device of the local node, and a transmission unit that transmits the setting completion response to the orchestrator after completing setting of the setting information.

An orchestrator according to an aspect of the present invention is an orchestrator that is connected to a plurality of nodes constituting an optical transport network and connected to a first computer and a second computer that perform communication via the optical transport network, the orchestrator including: a reception unit that receives a communication requirement related to communication with the second computer from the first computer; a calculation unit that determines an optical path to be used for the communication based on the communication requirement and a state of an optical transport path of the optical transport network, and calculates setting information to be set to an optical network device of each of the plurality of nodes to construct the optical path; and a transmission unit that transmits the setting information to the optical network device to each of the plurality of nodes.

A control method according to an aspect of the present invention is a control method for an optical transport network performed by a plurality of nodes constituting the optical transport network, a first computer and a second computer that perform communication via the optical transport network, and an orchestrator connected to the plurality of nodes and the first computer and the second computer, the control method including: by the first computer, transmitting a communication requirement related to communication with the second computer to the orchestrator; by the orchestrator, receiving the communication requirement from the first computer; determining an optical path to be used for the communication based on the communication requirement and a state of an optical transport path of the optical transport network, and calculating setting information to be set to an optical network device of each of the plurality of nodes to construct the optical path; transmitting the setting information to the optical network device to each of the plurality of nodes; by each of the plurality of nodes, receiving the setting information to the optical network device of a local node from the orchestrator; setting the setting information to the optical network device of the local node; transmitting a setting completion response of the setting information to the orchestrator after completing setting of the setting information; by the orchestrator, transmitting a setting completion notification of the optical path constructed in the optical transport network to the first computer after receiving the setting completion response from the plurality of nodes; and by the first computer, receiving the setting completion notification from the orchestrator.

A control method according to an aspect of the present invention is a control method for an optical transport network performed by an orchestrator that is connected to a plurality of nodes constituting the optical transport network and connected to a first computer and a second computer that perform communication via the optical transport network, the control method including: receiving a communication requirement related to communication with the second computer from the first computer; determining an optical path to be used for the communication based on the communication requirement and a state of an optical transport path of the optical transport network, and calculating setting information to be set to an optical network device of each of the plurality of nodes to construct the optical path; and transmitting the setting information to the optical network device to each of the plurality of nodes.

A control program according to an aspect of the present invention causes a computer to execute the control method.

Advantageous Effects of Invention

According to the present invention, it is possible to provide a technology capable of optimally controlling an optical transport network automatically according to communication requirements from geographically dispersed computers without manual operation.

DESCRIPTION OF EMBODIMENTS

Hereinafter, an embodiment of the present invention will be described with reference to the drawings. In the drawings, the same portions are denoted by the same reference signs, and description thereof is omitted.

SUMMARY OF INVENTION

When carrier edge computing is developed in the future, it is expected that communication requests having various communication requirements will occur between geographically distributed computers (Reference Literature 1). Therefore, a technology is required that is capable of automatically setting and controlling a transmission mode and the like of an optical transport network to an optimal configuration according to communication requirements between geographically separated computers.

Reference Literature 1 is "P. Lu and 4 others, 'Highly efficient data migration and backup for big data applications in elastic optical inter-data-center networks', in IEEE Network, vol. 29, no. 5, 2015, p. 36-p. 42".

In recent years, a coherent DSP has appeared that is capable of realizing high reception sensitivity by coherent reception, correction of waveform degradation due to wavelength dispersion, polarization mode dispersion, or the like of a fiber by using an electronic circuit, and high frequency utilization efficiency in multi-level modulation. In addition, opening of an optical transport network has attracted attention (Reference Literature 2), and a TAI has been proposed as an API for performing setting and control of an optical network device constituting the optical transport network independently of a vendor (Reference Literature 3). Furthermore, by introducing technology of the coherent DSP into an optical transport system, a state of an optical transport path can be remotely acquired as an application thereof (Reference Literature 4).

Reference Literature 2 is "M. Newland and 4 others, 'Open optical communication systems at a hyperscale operator', in Journal of Optical Communications and Networking, vol. 12, no. 6, 2020, p. C50-p. C57".

Reference Literature 3 is "V. Lopez and 5 others, 'Enabling fully programmable transponder white boxes', in Journal of Optical Communications and Networking, vol. 12, no. 2, 2020, p. A214-p. A223".

Reference Literature 4 is "T. Sasai and 8 others, 'Simultaneous Detection of Anomaly Points and Fiber types in Multi-Span Transmission Links Only by Receiver-side Digital Signal Processing', in Optical Fiber Communication Conference (pp, Th1F-1), Optical Society of America, 2020".

In the future, when the above technology is introduced into the optical transport network, it is possible to automate grasping of a state of an optical transport path and setting and control of an optical network device which have been manually performed so far. However, the optical transport network and the computer are located in different layers, and it is necessary to automatically control the optical transport network of the lower layer to an optimum configuration in cooperation with the geographically distributed computer of the upper layer and in consideration of a communication requirement from the computer.

In this regard, in Patent Literature 1 and Non Patent Literature 1, in the optical transport network of the lower layer, the configuration of the optical transport network cannot be optimally set and controlled automatically in cooperation with the upper layer in response to a request from the computer located in the upper layer.

In addition, when transmission modes such as 400G, 800G, and 1T are used in the optical transport network, a nonlinear effect becomes more remarkable than before. In particular, it is necessary to design an optical path between computers in sufficient consideration of nonlinear effects such as interphase modulation and four-wave mixing depending on a state of an optical transport path (wavelength in use).

In addition to the nonlinear effect, there are various factors that define transport quality such as polarization mode dispersion, wavelength dispersion, and the limit of an optical signal to noise ratio (OSNR), and it is necessary to optimally control the optical transport network automatically on the basis of the information.

Therefore, the present invention proposes an orchestrator for monitoring and managing the entire optical transport network and performing centralized control. The orchestrator operates between a computer of an upper layer and an optical transport network of a lower layer, and constructs an optical path in the optical transport network by setting and controlling an optical network device on the basis of a communication requirement from the computer and a state of an optical transport path of the optical transport network. As a result, it is possible to optimally control the optical transport network automatically in response to requests from geographically distributed computers without manual operation.

[Configuration of Optical Transport System]

Figure 1:
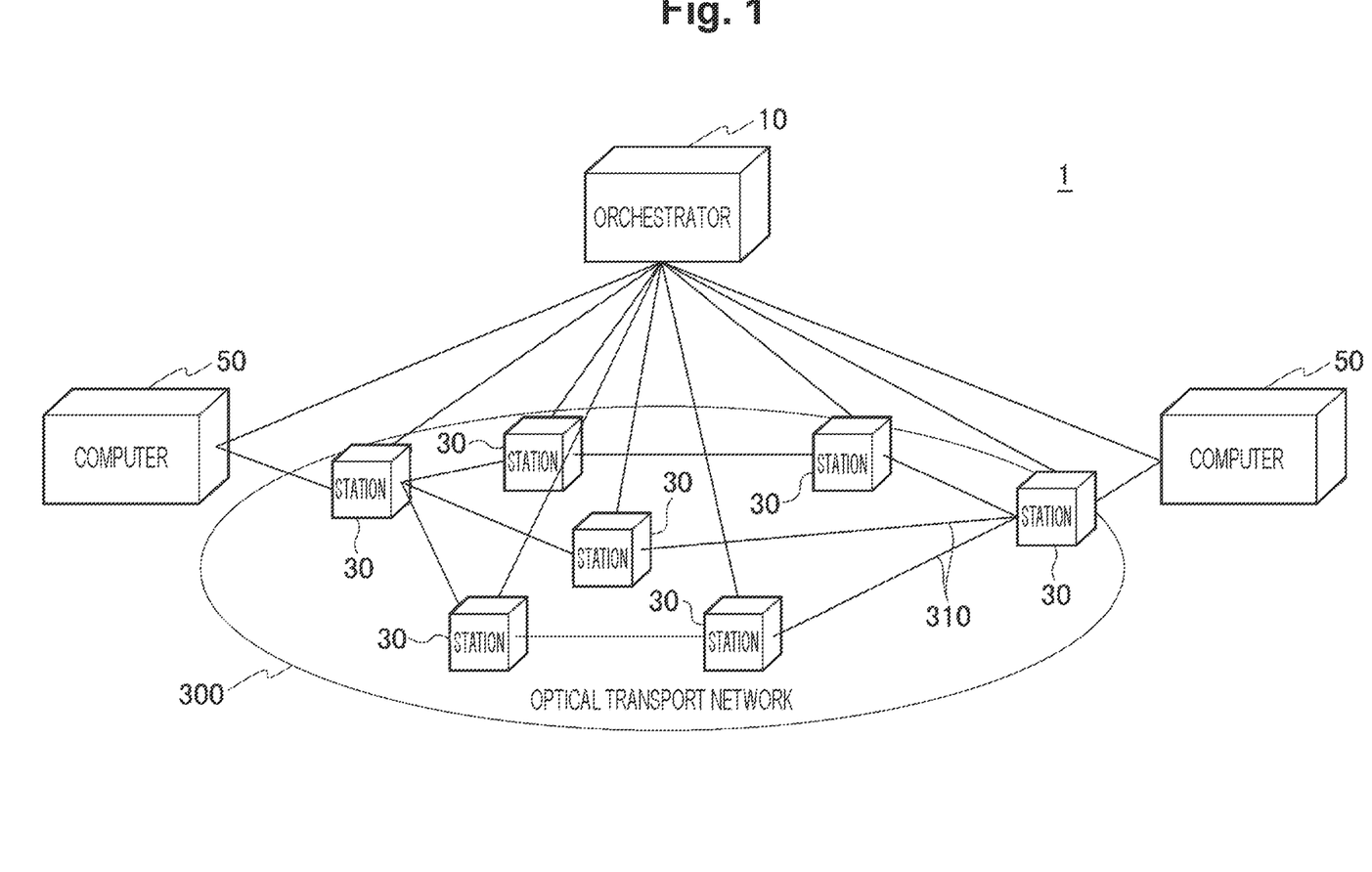
FIG. 1 is a diagram illustrating an overall configuration of an optical transport system.

FIG. 1 is a diagram illustrating an overall configuration of an optical transport system 1 according to the present embodiment. The optical transport system 1 includes one orchestrator 10, seven stations 30, and two computers 50 geographically distributed. The orchestrator 10 is connected to each station 30 and is also connected to each computer 50. The seven stations 30 are mutually communicably connected with each other via optical transport paths 310 to constitute an optical transport network 300. Each computer 50 is connected to a station 30 located at an edge of the optical transport network 300. The number of each of the stations 30 and the computers 50 is optional.

[Configuration of Orchestrator]

The orchestrator 10 is a control device that controls the optical transport network 300 according to a communication requirement from the computer 50.

Figure 2:
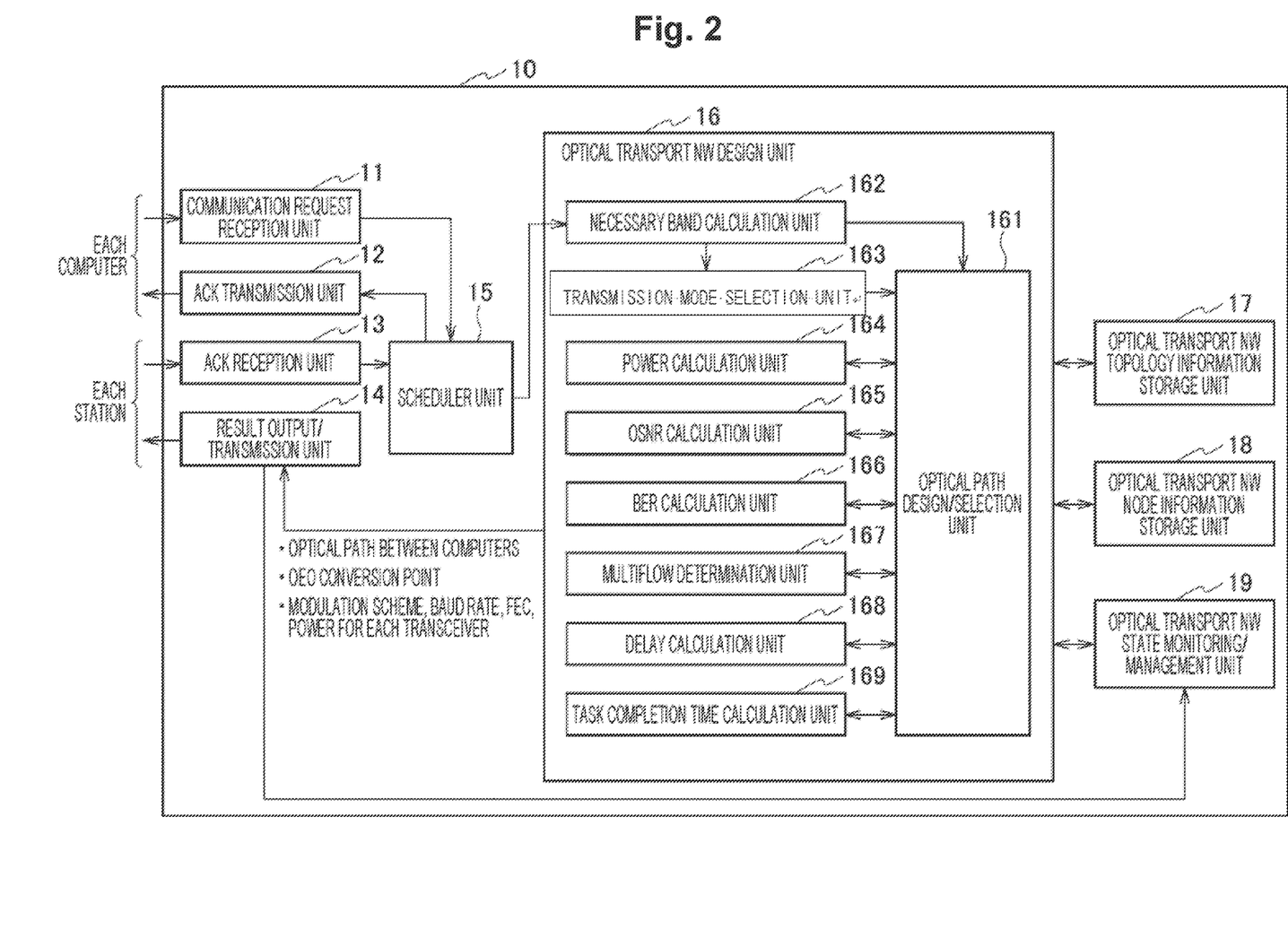
FIG. 2 is a diagram illustrating a functional block configuration of an orchestrator.

FIG. 2 is a diagram illustrating a functional block configuration of the orchestrator 10. The orchestrator 10 includes a communication request reception unit 11, an ACK transmission unit 12, an ACK reception unit 13, a result output/transmission unit 14, a scheduler unit 15, an optical transport NW design unit 16, an optical transport NW topology information storage unit 17, an optical transport NW node information storage unit 18, and an optical transport NW state monitoring/management unit 19.

The communication request reception unit (reception unit) 11 is connected to the computer 50 and has a function of receiving a communication request that includes a communication requirement related to communication from the computer 50. The communication requirement includes a type of an application that performs communication, a necessary band, a total amount of data, an allowable delay time, a task completion time, a bit error rate (BER), power, and the like. The communication request includes completion of the task within 10 msec, data backup, transfer of 1 Tbite data from a computer A to a computer B, and the like.

The ACK transmission unit (transmission unit) 12 is connected to the computer 50, and has a function of transmitting an optical path setting completion notification to the computer 50 after receiving a setting completion response of setting information to an optical network device (hereinafter, an optical NW device) from all the stations 30. That is, the ACK transmission unit 12 is a functional unit that notifies the computer 50 as a request source of an ACK indicating a completion of optical path construction as soon as the two computers 50 as the request source and a request destination can communicate with each other after construction of the optical path is completed in the optical transport network 300.

The ACK reception unit 13 is connected to each station 30 and has a function of receiving a setting completion response of setting information to the optical NW device from each station 30. That is, the ACK reception unit 13 is a functional unit that receives an ACK indicating setting completion of the setting information to the optical NW device from each station 30.

The result output/transmission unit (transmission unit) 14 is connected to each station 30, and has a function of transmitting, to each station 30, setting information to the optical NW device of each station 30. That is, the result output/transmission unit 14 transmits the following setting information that is designed and selected to optimally control the optical transport network 300 to an optical NW device group constituting the optical transport network 300.

An optical path between computers
An optical-electro-optical (OEO) conversion point (=DSP insertion position)
(i) A modulation scheme, (ii) a baud rate, (iii) transmission power, and (iv) forward error correction (FEC) overhead which are set to a transceiver of each station More specifically, the following setting information is assumed.

Setting of an optical path between computers, an OEO conversion point, (i) a modulation scheme, (ii) a baud rate, (iii) transmission power, and (iv) FEC (overhead) to an optical NW device group present in each station, which are designed and selected to satisfy a communication requirement Setting of an optical path between computers, an OEO conversion point, (i) a modulation scheme, (ii) a baud rate, (iii) transmission power, and (iv) FEC (overhead) to an optical NW device group present in each station, which are designed and selected so as to minimize resource usage of the entire optical transport network Setting of an optical path between computers, an OEO conversion point, (i) a modulation scheme, (ii) a baud rate, (iii) transmission power, and (iv) FEC (overhead) to an optical NW device group present in each station, which are designed and selected so as to minimize power consumption of the entire optical transport network The result output/transmission unit 14 transmits the above setting information to each station 30, and sets the setting information in the optical NW device of each station 30. For example, the above (i) to (iv) are set to a transceiver B of a station A. Note that the optical NW device is a transceiver (transponder), an optical cross connect (OXC), a re-configurable optical add/drop multiplexer (ROADM), an amplifier, or the like.

The scheduler unit 15 has a function of managing and scheduling a plurality of communication requests received from the computer 50. Since it takes a certain time to complete design and opening of an optical path, in a case where the plurality of communication requests is mixed, the scheduler unit 15 performs scheduling from a communication request with a higher priority.

The optical transport NW design unit (calculation unit) 16 has a function of determining an optical path used for communication executed by the computer 50 on the basis of a communication requirement received from the computer 50 and a state of an optical transport path of the optical transport network 300, and calculating setting information to be set to the optical NW device of each station 30 in order to construct the optical path.

In order to realize the function, the optical transport NW design unit 16 includes an optical path design/selection unit 161, a necessary band calculation unit 162, a transmission mode selection unit 163, a power calculation unit 164, an OSNR calculation unit 165, a BER calculation unit 166, a multiflow determination unit 167, a delay calculation unit 168, and a task completion time calculation unit 169.

The optical path design/selection unit 161 has a function of enumerating a set of candidate optical paths and selecting an optimum optical path on the basis of a communication requirement received from the computer 50. The optimum means, for example, a case where a delay, a task completion time, a necessary band, a resource usage of the entire optical transport network 300, and power consumption of the entire optical transport network 300 are optimal.

In order to select the optimum optical path, the optical path design/selection unit 161 cooperates with the necessary band calculation unit 162 to the task completion time calculation unit 169, and refers to information on the optical transport network 300 that is stored in the optical transport NW topology information storage unit 17 to the optical transport NW state monitoring/management unit 19. Note that there is a trade-off relationship between a transport capacity and a distance. Reference Literatures 5 to 7 described later can be used for a method of selecting an optimum optical transmission mode according to the distance in consideration of the relationship.

The necessary band calculation unit 162 has a function of calculating a necessary band on the basis of a communication requirement received from the computer 50 as the request source in communication between the two computers 50 as the request source and the request destination.

The transmission mode selection unit 163 has a function of enumerating candidate transmission modes on the basis of a band or an application type required for communication between the two computers 50 as the request source and the request destination. The transmission mode selection unit 163 has a function of calculating a modulation scheme, a baud rate, an FEC, and the like to be set to each transceiver for a candidate transmission mode on a candidate optical path between the computers 50 as the request source and the request destination, Note that Patent Literature 1 can be used as a method of selecting an optimum transmission mode on the basis of these parameters.

The power calculation unit 164 has a function of calculating appropriate transmission power to be set for each transceiver in a candidate optical path between the two computers 50 as the request source and the request destination.

The OSNR calculation unit 165 has a function of calculating an OSNR on a candidate optical path between the two computers 50 as the request source and the request destination. The OSNR calculation unit 165 uses a network state of a certain optical path between the two computers 50 as the request source and the request destination as an input value, and uses an OSNR on the input optical path as an output value. Reference Literature 5 can be used as a method of calculating the OSNR.

Reference Literature 5 is "A. Ferrari and 8 others, 'GNPy: an open source application for physical layer aware open optical networks', in Journal of Optical Communications and Networking, vol. 12, no. 6, 2020, p. C31-p. C40".

The BER calculation unit 166 has a function of calculating BER on the basis of an OSNR or a margin on a certain optical path. For example, with reference to Reference Literature 6, $BER_{p,\lambda}$ when an optical path p is established at a wavelength $\lambda$ can be calculated by Formula (1).

$$BER_{p,\lambda} = \psi(OSNR_{p,\lambda} - M_T(\tau) - M_d(\tau)) \quad (1)$$

Note that $\psi(\cdot)$ is a calculation formula of the BER according to a specific modulation format of a specific optical path. $M_T(\tau)$ is a system margin based on aging degradation. $M_d(\tau)$ is a design margin.

Reference Literature 6 is "P. Soumplis and 4 others, 'Multi-period planning with actual physical and traffic conditions', in IEEE/OSA Journal of Optical Communications and Networking, vol. 10, no. 1, 2018, p. A144-p. A153".

The multiflow determination unit 167 has a function of determining whether or not multiflow is necessary on a section constituting an optical path on the basis of a communication requirement received from the computer 50 as a request source on the certain candidate optical path between the two computers 50 as the request source and the request destination. Reference Literature 7 can be used as a technique related to the multiflow communication.

Reference Literature 7 is "M. Jinno and 4 others, 'Multiflow optical transponder for efficient multilayer optical networking', in IEEE Communications Magazine, vol. 50, no. 5, 2012, p. 56-p. 65".

The delay calculation unit 168 has a function of calculating a communication delay time on a certain optical path between the two computers 50 as the request source and the request destination. In the calculation of the communication delay time, the delay calculation unit 168 uses topology information of a certain optical path between the computers and the optical transport network 300 as an input value, and uses a communication delay on the input optical path as an output value. Note that the communication delay time is basically determined by a distance between nodes.

The task completion time calculation unit (calculation unit) 169 has a function of calculating a task completion time that is required to complete a task of communication on the basis of an optical path of a selected candidate.

The optical transport NW topology information storage unit 17 has a function of holding topology information related to connection and a distance between the stations 30. The topology information is required for optical path design, multiflow determination, and the like.

The optical transport NW node information storage unit 18 has a function of holding node information related to a type and the number of transceivers present in each station 30. The node information is required for optical path design because reception sensitivity (required OSNR) varies depending on the type of the transceiver. The optical transport NW node information storage unit 18 also has a function of holding node information related to a type and the number of amplifiers present in each station 30. The node information is required because a noise figure (NF) varies depending on the type of amplifier such as Raman amplification and an erbium doped fiber amplifier (EDFA). The optical transport NW node information storage unit 18 also has a function of holding node information related to a type and a form (the number of ports and the like) of optical nodes (OXC, ROADM) present in each station 30.

The optical transport NW state monitoring/management unit 19 has a function of holding monitoring/management information related to a use state and a state of the amplifier, the transceiver, and the optical node present in each station 30. The optical transport NW state monitoring/management unit 19 also has a function of holding monitoring/management information regarding loss of an optical signal, such as a use state of a wavelength in each link, aging deterioration, a splice in each link, and a connector location. The monitoring/management information is information necessary when an optical path (wavelength path) is selected because a nonlinear effect (in particular, cross phase modulation (XPM), four-wave mixing (FWM)) affects loss and a BER depending on the use state of a wavelength. The optical transport NW state monitoring/management unit 19 has a function of updating storage information in accordance with addition/deletion of the optical path. The optical transport NW state monitoring/management unit 19 is connected to an optical transport path measurement unit of each station 30, and has a function of periodically receiving transport path information regarding a state and a margin of the transport path and sequentially storing the transport path information in an updatable manner.

[Configuration of Station]

Figure 3:
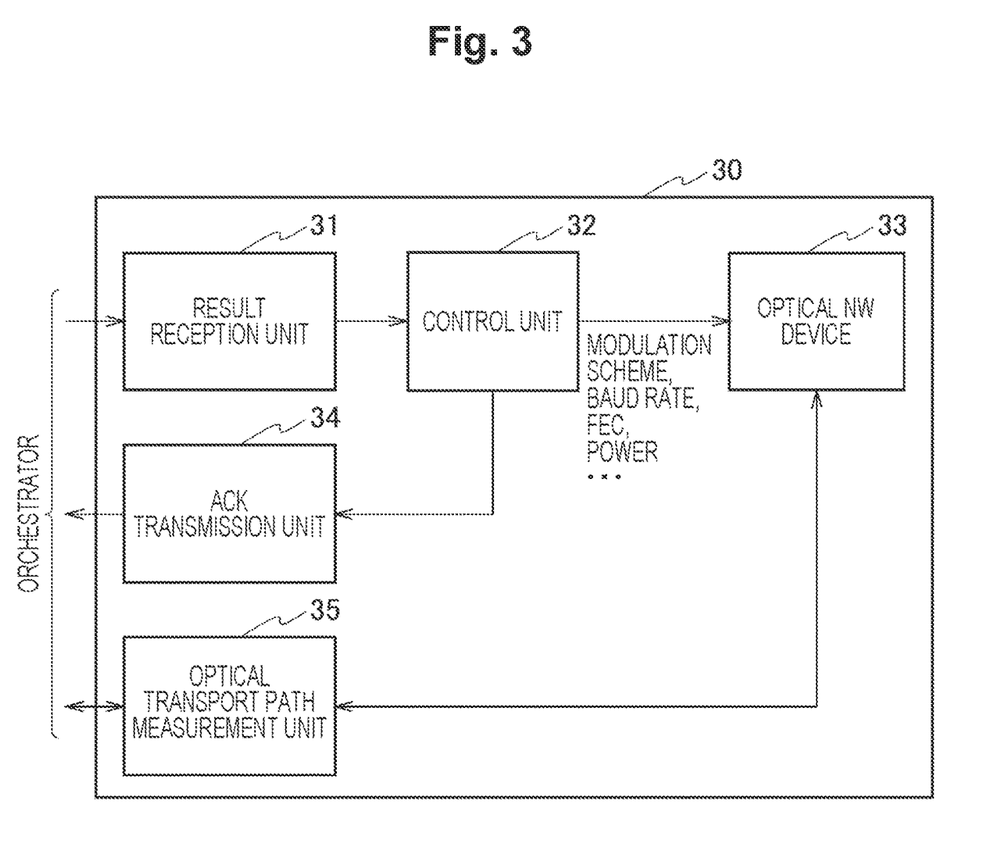
FIG. 3 is a diagram illustrating a functional block configuration of a station.

The station 30 is a node constituting the optical transport network 300.

FIG. 3 is a diagram illustrating a functional block configuration of the station 30. The station 30 includes a result reception unit 31, a control unit 32, an optical NW device 33, an ACK transmission unit 34, and an optical transport path measurement unit 35.

The result reception unit (reception unit) 31 is connected to the orchestrator 10 and has a function of receiving setting information to the optical NW device 33 of a local node from the orchestrator 10. That is, the result reception unit 31 has a function of receiving setting information to be set to the optical NW device 33 from the orchestrator 10 and passing the setting information to the control unit 32.

The control unit (setting unit) 32 has a function of setting and controlling the setting information that is received from the orchestrator 10 in the optical NW device 33 of the local node. That is, the control unit 32 sets and controls the optical NW device 33 as follows on the basis of the setting information received from the orchestrator 10.

Set a transmission mode (a modulation scheme, a baud rate, FEC, etc.) and transmission power to each transceiver (transponder)

Set a wavelength of add-drop/through in the ROADM OR the OXC

Allocate a wavelength to be amplified to the amplifier

As soon as the setting and control are completed, the control unit 32 notifies the ACK transmission unit 34 of the completion.

The optical NW device 33 is an optical NW device constituting the optical transport network 300, such as a transceiver, an OXC, a ROADM, or an amplifier.

The ACK transmission unit (transmission unit) 34 is connected to the orchestrator 10, and has a function of transmitting, to the orchestrator 10, a setting completion response of the setting information to the optical NW device 33 after completing setting of the setting information to the optical NW device 33. That is, the ACK transmission unit 34 is a functional unit that notifies the orchestrator 10 of ACK indicating the completion as soon as the setting and control to the optical NW device 33 are completed.

The optical transport path measurement unit (measurement unit) 35 is connected to the orchestrator 10, and has a function of measuring a state and a margin of an optical transport path of the optical transport network 300 and transmitting the state and the margin to the orchestrator 10. That is, the optical transport path measurement unit 35 is a functional unit/measurement device that measures the actual state/margin of the optical transport path. For example, from Reference Literature 4, the optical transport path measurement unit 35 estimates and calculates the state of the optical transport path periodically or when there is a request on the basis of a signal received by a coherent DSP, and transmits state information of the optical transport path to the orchestrator 10.

[Configuration of Computer]

Figure 4:
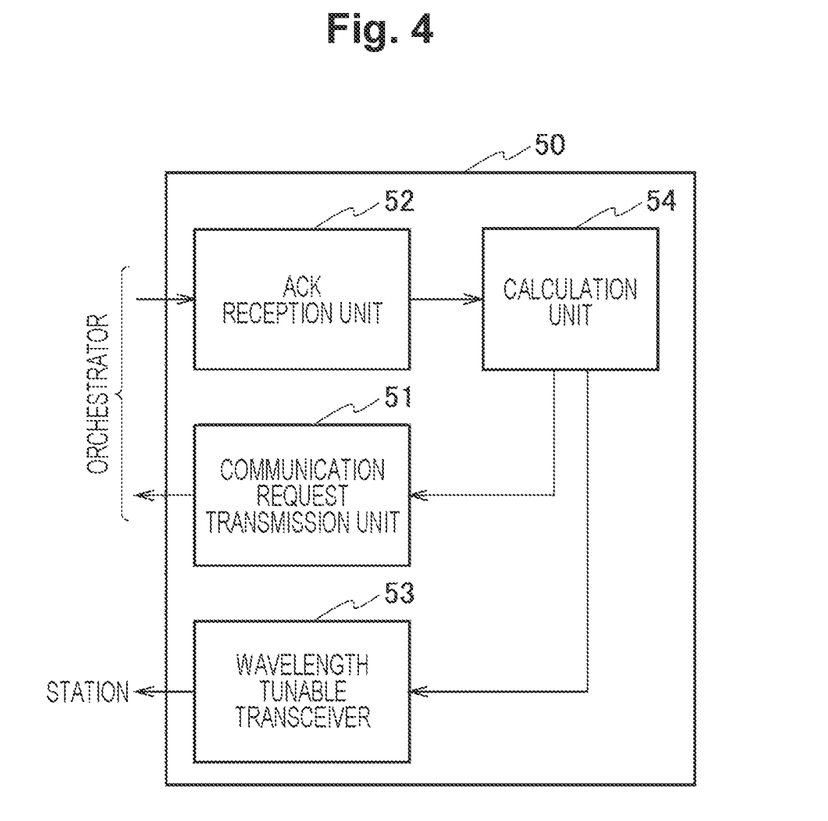
FIG. 4 is a diagram illustrating a functional block configuration of a computer.

The computer 50 is, for example, an edge cloud or a data center installed in Tokyo or Osaka. The computer 50 is connected to the optical transport network 300 and performs communication via the optical transport network 300.

FIG. 4 is a diagram illustrating a functional block configuration of the computer 50, The computer 50 includes a communication request transmission unit 51, an ACK reception unit 52, a wavelength tunable transceiver 53, and a calculation unit 54.

The communication request transmission unit (transmission unit) 51 is connected to the orchestrator 10, and has a function of transmitting a communication request including a communication requirement related to communication with the computer 50 as the request destination to the orchestrator 10. That is, when communication is performed with the computer 50 of a communication partner, the communication request transmission unit 51 is a functional unit that specifies a requirement of the communication and transmits it as a communication request to the orchestrator 10.

The ACK reception unit (reception unit) 52 is connected to the orchestrator 10, and has a function of receiving a setting completion notification of an optical path constructed in the optical transport network 300 from the orchestrator. That is, the ACK reception unit 52 is a functional unit that receives, from the orchestrator 10, an ACK indicating that setting and control to the optical NW device constituting the optical transport network 300 are completed.

The wavelength tunable transceiver 53 is connected to the optical transport network 300, and is a wavelength tunable transceiver capable of dynamically switching a wavelength.

The calculation unit 54 includes computing resources such as a CPU, a memory, and a storage, and has a function of operating a software program of an application designated by a user in the computer 50. The calculation unit 54 has a function of outputting an optical signal for communicating with the other computer 50 to the wavelength tunable transceiver 53.

[Basic Operation of Optical Transport System]

Figure 5:
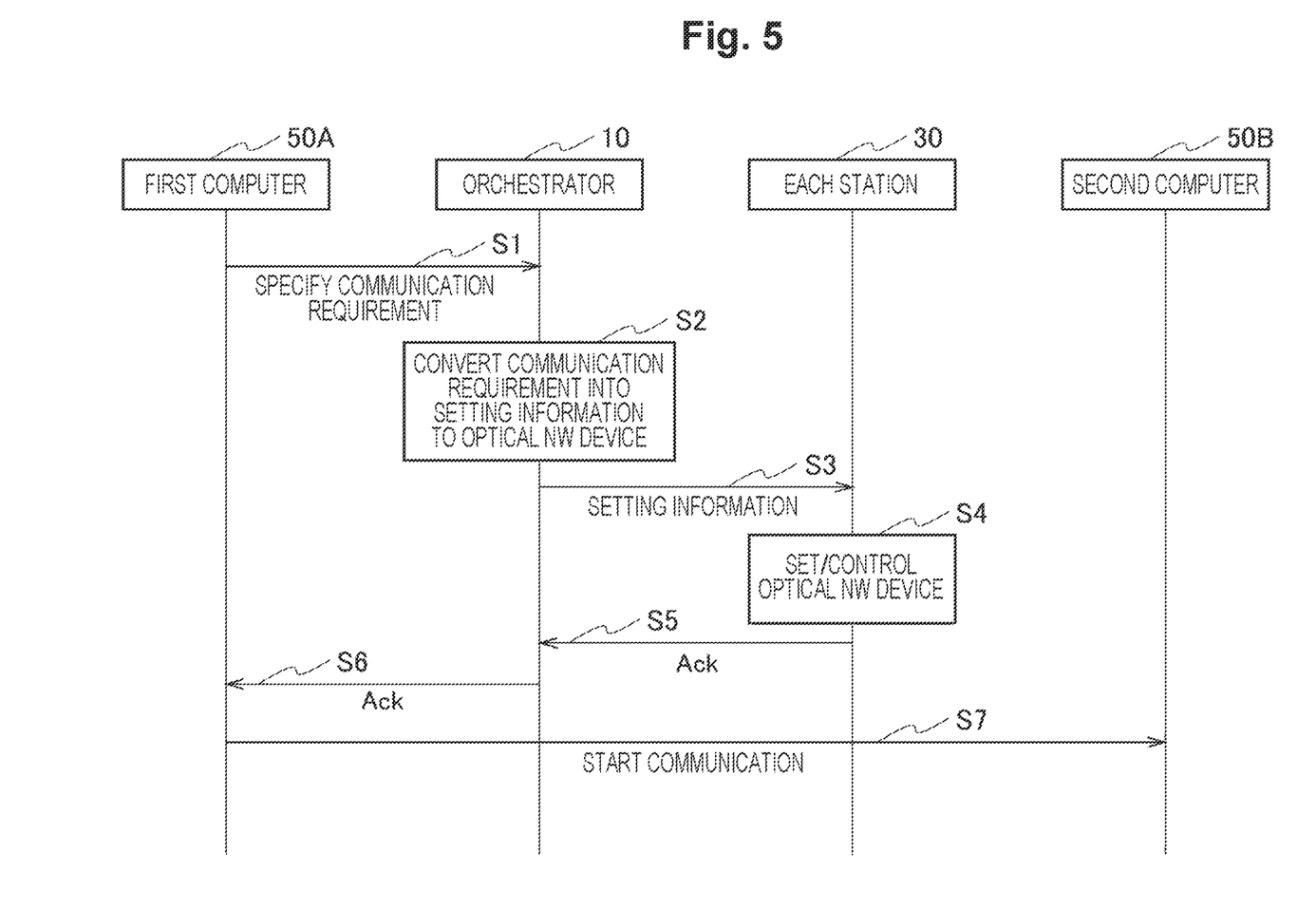
FIG. 5 is a sequence diagram illustrating basic operation of the optical transport system.

FIG. 5 is a sequence diagram illustrating basic operation of the optical transport system 1.

Step S1;

In order to perform communication with a second computer 50B, a first computer 50A transmits a communication request specifying a communication requirement of the communication to the orchestrator 10. The communication request is transfer of data or a file, transport or distribution of a video, or the like. The communication requirement includes a type of an application that performs the communication, a necessary band, a total amount of data, an allowable delay time, a task completion time, a BER, power, and the like.

Step S2;

The orchestrator 10 determines an optical path used for the communication by the first computer 50A based on the communication requirement from the first computer 50A and a state of an optical transport path of the optical transport network 300 received in advance from each station 30, and calculates setting information to be set to the optical NW device 33 of each station 30 to construct the optical path.

For example, the orchestrator 10 calculates setting information regarding the optical path between the first computer 50A and the second computer 50B, an OEO conversion point, and (i) a modulation scheme, (ii) a symbol rate, (iii) transmission power, and (iv) FEC (overhead) that are set to the transceiver of each station 30.

At this time, the orchestrator 10 performs calculation such that a delay, a task completion time, a necessary band, a resource usage of the entire optical transport network 300, and power consumption of the entire optical transport network 300 are optimized. For example, the orchestrator 10 calculates the setting information to satisfy the foregoing communication requirement, calculates the setting information to minimize the resource usage of the entire optical transport network 300, and/or calculates the setting information to minimize the power consumption of the entire optical transport network 300.

Step S3;

The orchestrator 10 transmits the setting information to each station 30.

Step S4;

Each station 30 sets and controls the setting information to the optical NW device 33 of the local node. For example, the station 30 sets a transmission mode (a modulation scheme, a symbol rate, FEC, and the like) and transmission power to each transceiver on the basis of the above setting information, sets a wavelength of add-drop/through to the ROADM or the OXC, and allocates a wavelength to be amplified to the amplifier.

Step S5;

Each station 30 notifies the orchestrator 10 of an ACK indicating a completion as soon as the setting and control to the optical NW device 33 are completed.

Step S6;

After receiving the ACKs from all the stations 30, the orchestrator 10 notifies the first computer 50A as a request source of an ACK indicating an optical path setting completion notification.

Step S7;

After receiving the ACK from the orchestrator 10, the first computer 50A starts communication with the second computer 50B via an optical path constructed in the optical transport network 300.

Here, examples of conversion into the setting information performed in step S2 will be described.

Figure 6:
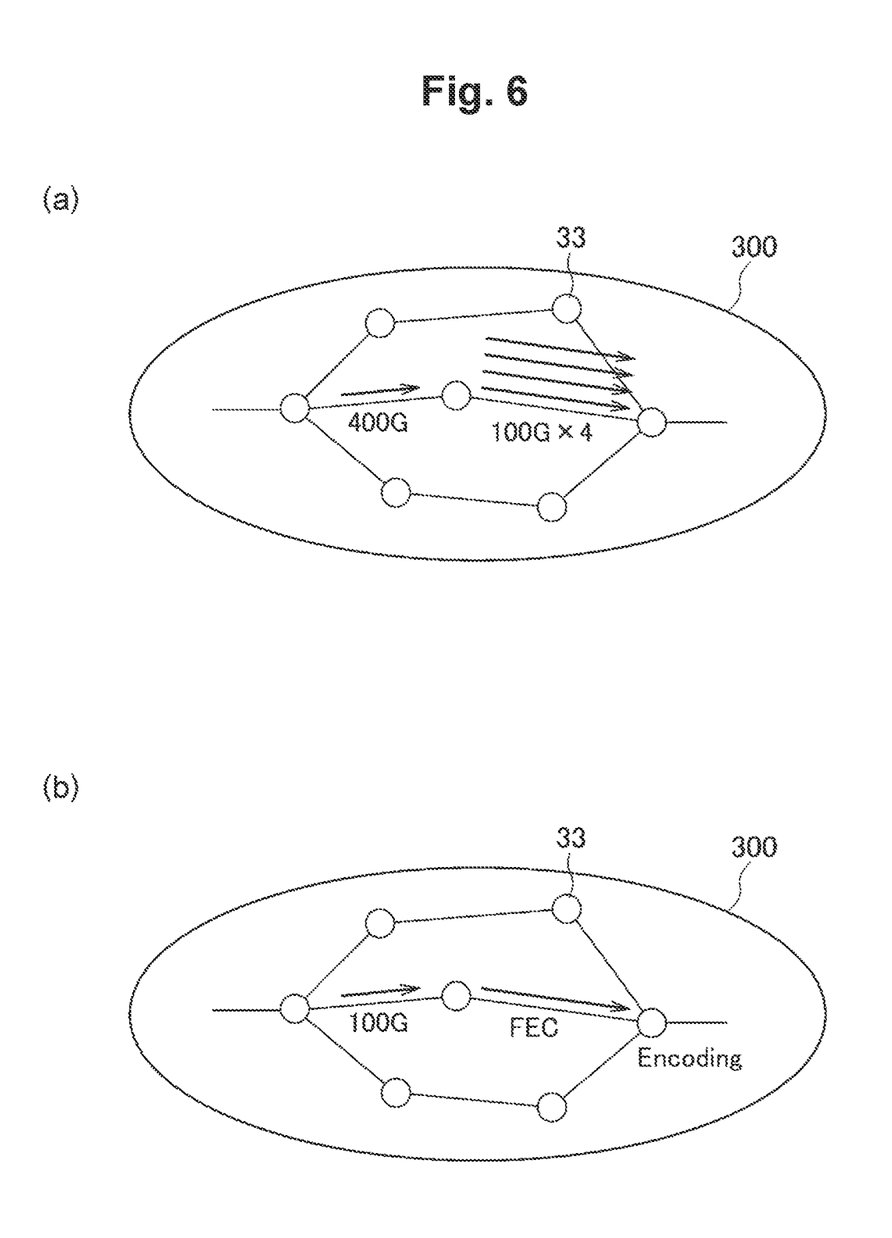
FIG. 6 is a diagram illustrating a design example of an optical path.

For example, there is a case where high-speed communication such as 400 Gbps is required, but target data cannot be transmitted due to a long distance in a certain section. In this case, the orchestrator 10 performs multiflow in which one optical path of a 400 Gbps band is selected in a section in which the target data can be transmitted, and four optical paths of 100 Gbps are selected in a section in which the target data cannot be transmitted (see FIG. 6(a)).

In addition, in a case where low delay communication such as 100 us or BER $10^{-3}$, for example, video distribution is required, the orchestrator 10 selects the shortest optical path, selects an appropriate FEC, and selects the optical NW device 33 that performs encoding (see FIG. 6(b)).

[Operation Example 1 of Optical Transport System]

Figure 7:
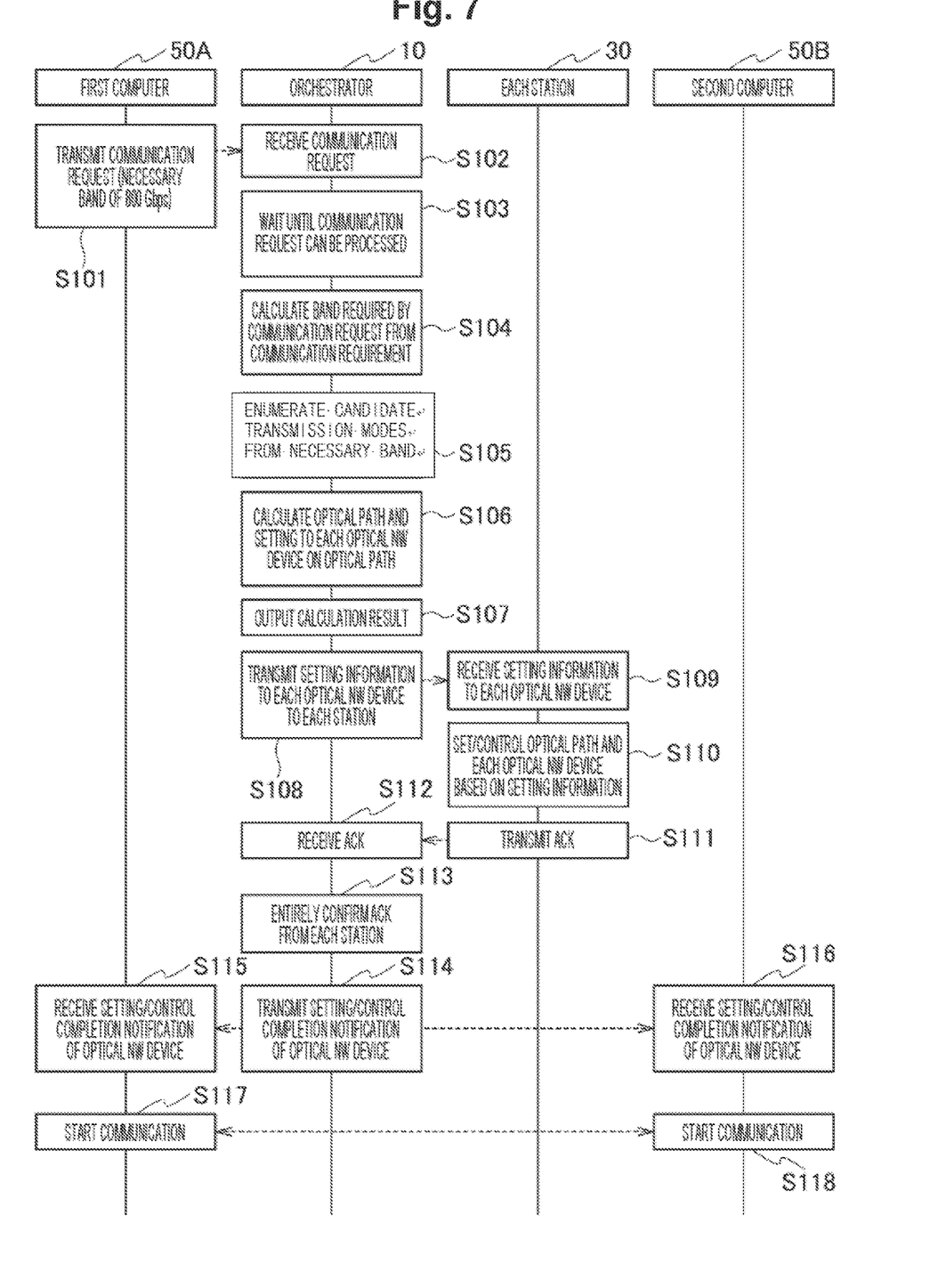
FIG. 7 is a sequence diagram illustrating operation example 1 of the optical transport system.

In operation example 1, a case where a necessary band (800 Gbps) is provided as a communication requirement will be described.

FIG. 7 is a sequence diagram illustrating operation example 1 of the optical transport system.

Step S101;

When performing communication with the second computer 50B in the above communication requirement, the first computer 50A transmits a communication request including the communication requirement to the orchestrator 10 via the communication request transmission unit 51.

Step S102;

The orchestrator 10 receives the communication request from the first computer 50A via the communication request reception unit 11 and transmits the communication request to the scheduler unit 15.

Step S103;

After the above communication request can be processed, the scheduler unit 15 transmits the communication request to the optical transport NW design unit 16. Hereinafter, a method of converting the communication requirement into setting information to be performed in steps S104 to S106 may be selected by a user by preparing a menu table in advance, or may be calculated on demand so as to meet the communication requirement. Hereinafter, a case where calculation is performed on demand will be described.

Step S104;

In the optical transport NW design unit 16, the necessary band calculation unit 162 calculates a necessary band that is actually required for the above communication requirement, and transmits a value of the necessary band to the transmission mode selection unit 163.

Step S105;

The transmission mode selection unit 163 enumerates candidate transmission modes from the value of the above necessary band, and transmits the transmission mode to the optical path design/selection unit 161.

Step S106;

The optical path design/selection unit 161 cooperates with the power calculation unit 164, the OSNR calculation unit 165, the BER calculation unit 166, the multiflow determination unit 167, the delay calculation unit 168, the task completion time calculation unit 169, the optical transport NW topology information storage unit 17, the optical transport NW node information storage unit 18, and the optical transport NW state monitoring/management unit 19, determines an optical path to be used on the basis of a current state of an optical transport path and the like, and calculates setting information to each optical NW device 33 that is used to construct the optical path.

Step S107;

The optical transport NW design unit 16 transmits the above setting information to the result output/transmission unit 14.

Step S108;

The result output/transmission unit 14 outputs the setting information to the optical transport NW state monitoring/management unit 19 and transmits the setting information to each station 30.

Step S109;

In each station 30, the result reception unit 31 receives the setting information and transmits the setting information to the control unit 32.

Step S110;

The control unit 32 sets the setting information to the optical NW device 33, Then, as soon as the setting and control to the optical NW device 33 are completed, the control unit 32 notifies the ACK transmission unit 34 of the completion.

Step S111;

The ACK transmission unit 34 transmits an ACK to the orchestrator 10 as soon as the setting/control completion to the optical NW device 33 is notified from the control unit 32.

Step S112;

In the orchestrator 10, the ACK reception unit 13 receives the ACK from the station 30 and transmits the ACK to the scheduler unit 15.

Step S113;

Upon confirming that the ACKs have been received from all the stations 30, the scheduler unit 15 notifies the ACK transmission unit 12 of the setting/control completion to the optical NW device 33 (setting completion of the optical path).

Step S114;

As soon as the scheduler unit 15 notifies the ACK transmission unit 12 of the setting completion of the optical path, the ACK transmission unit 12 transmits the ACK to the first computer 50A as the request source and the second computer 50B as the request destination.

Steps S115 and S116;

The first computer 50A receives the ACK from the orchestrator 10. The second computer 50B receives the ACK from the orchestrator 10.

Steps S117 and S118;

The first computer 50A starts communication with the second computer 50B.

[Operation Example 2 of Optical Transport System]

Figure 8:
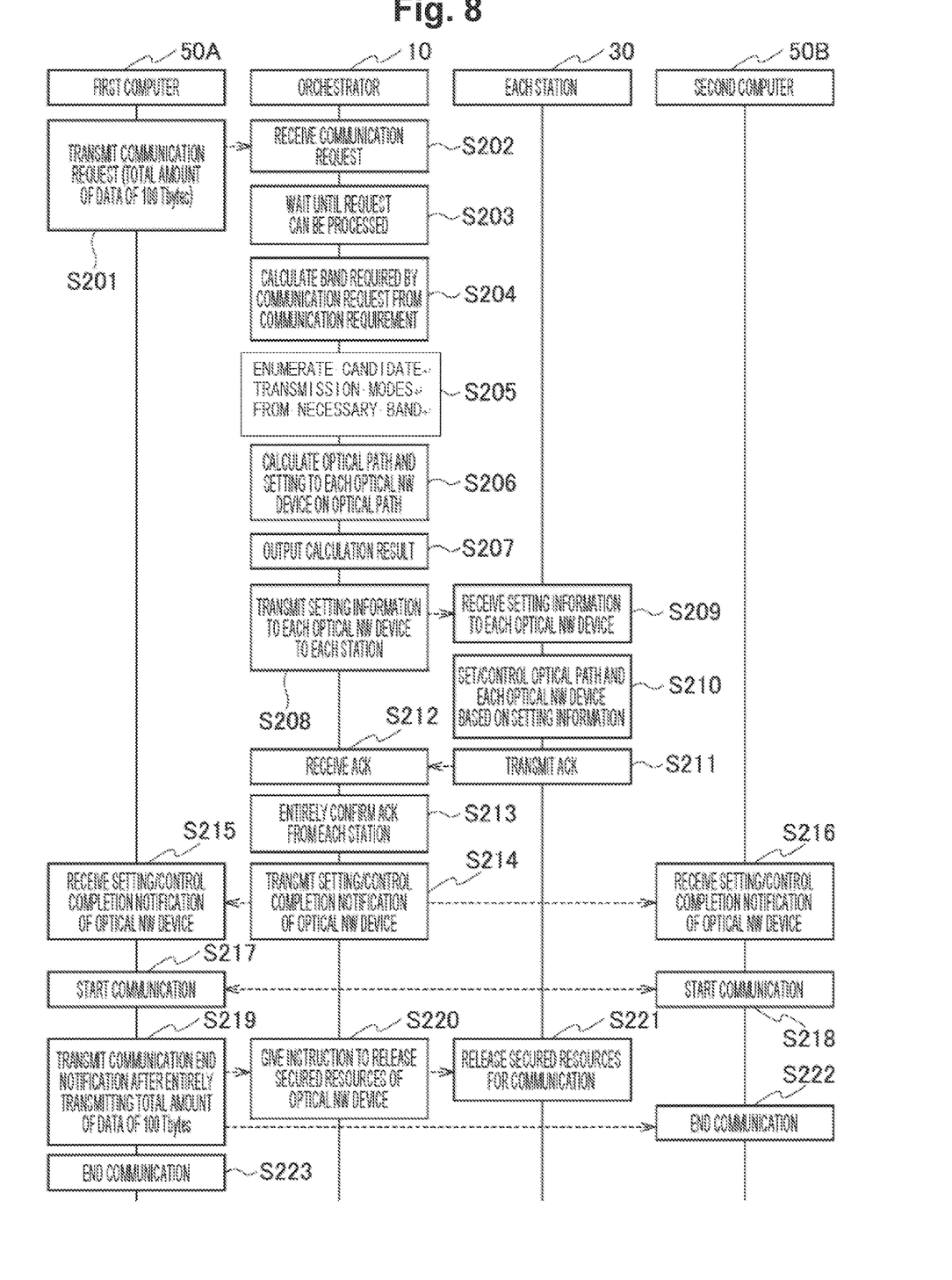
FIG. 8 is a sequence diagram illustrating operation example 2 of the optical transport system.

In operation example 2, a case will be described in which a total amount of data (100 Tbytes as a backup of data) is given as a communication requirement.

FIG. 8 is a sequence diagram illustrating operation example 2 of the optical transport system. Steps S201 to S218 are similar to steps S101 to S118.

Step S219;

The first computer 50A transmits all the total amount of data desired to be communicated, and transmits a communication end notification to the orchestrator 10 and the second computer 50B when ending the communication with the second computer 50B.

Step S220;

Upon receiving the communication end notification, the orchestrator 10 instructs each station 30 to release resources of the optical transport network 300 related to an optical path that is secured for communication.

Step S221;

Each station 30 releases the resources of the optical NW device 33 configuring the optical path in the optical transport network 300 upon receiving a resource release instruction from the orchestrator 10.

Steps S222 and S223;

The first computer 50A and the second computer 50B end the communication.

[Effects]

According to the present embodiment, the orchestrator 10 receives a communication requirement related to communication with the second computer 50B from the first computer 50A, determines an optical path to be used for the communication based on the communication requirement and a state of an optical transport path of the optical transport network 300, calculates setting information to be set to the optical NW device 33 of each station 30 in order to construct the optical path, and transmits the setting information to each optical NW device 33 to each station 30. Therefore, it is possible to optimally control an optimal optical transport network automatically according to communication quality/requirements requested by geographically dispersed computers. In particular, since an optimum modulation scheme and power are set for the transceiver in consideration of the state of the network, energy saving and efficient use of resources can be realized.

[Other Matters]

The present invention is not limited to the aforementioned embodiment. The present invention can be modified in various manners within the gist of the present invention.

Figure 9:
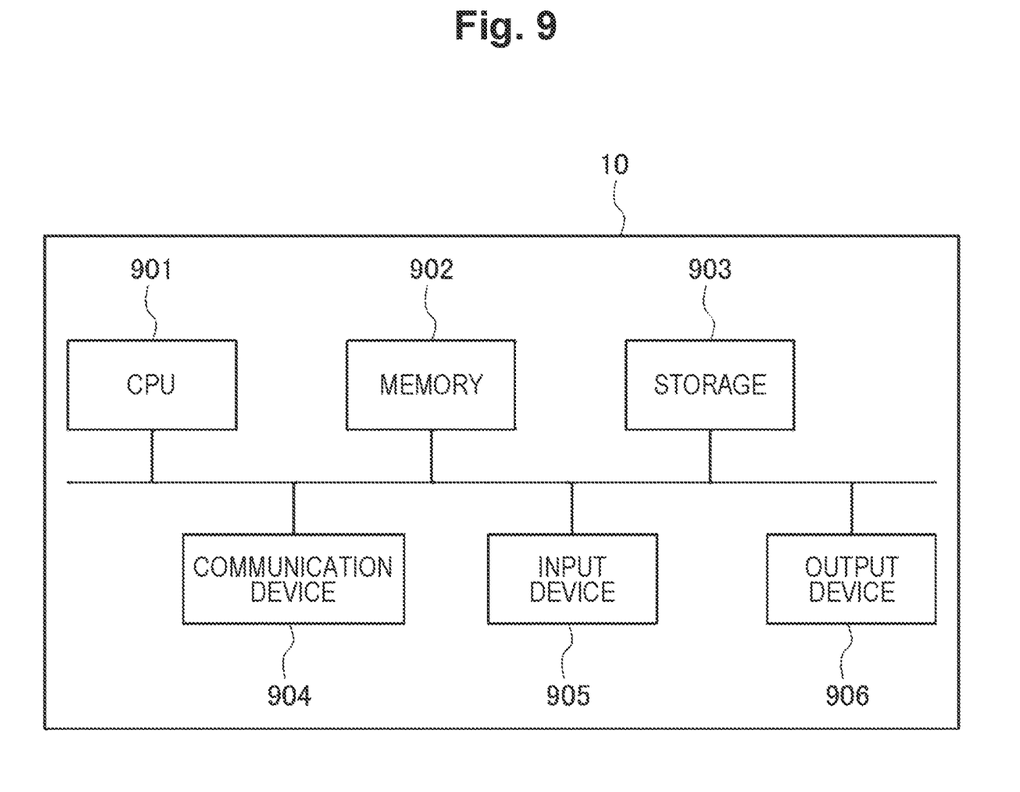
FIG. 9 is a diagram illustrating a hardware configuration of the orchestrator.

The orchestrator 10 according to the present embodiment described above can be realized using a general-purpose computer system including a central processing unit (CPU; processor) 901, a memory 902, a storage (a hard disk drive (HDD), a solid state drive (SSD)) 903, a communication device 904, an input device 905, and an output device 906 as illustrated in FIG. 9, for example. The memory 902 and the storage 903 are storage devices. In the computer system, each function of the orchestrator 10 is realized by the CPU 901 executing a predetermined program loaded on the memory 902.

The orchestrator 10 may be implemented by one computer. The orchestrator 10 may be implemented by a plurality of computers. The orchestrator 10 may be a virtual machine that is implemented in a computer.

The program for the orchestrator 10 can be stored in a computer-readable recording medium such as an HDD, an SSD, a universal serial bus (USB) memory, a compact disc (CD), or a digital versatile disc (DVD). The program for the orchestrator 10 can also be distributed via a Communication network.

REFERENCE SIGNS LIST

1 Optical transport system
10 Orchestrator
11 Communication request reception unit
12 ACK transmission unit
13 ACK reception unit
14 Result output/transmission unit
15 Scheduler unit
16 Optical transport NW design unit
161 Optical path design/selection unit
162 Necessary band calculation unit
163 Transmission mode selection unit
164 Power calculation unit
165 OSNR calculation unit
166 BER calculation unit
167 Multiflow determination unit
168 Delay calculation unit
169 Task completion time calculation unit
17 Optical transport NW topology information storage unit
18 Optical transport NW node information storage unit
19 Optical transport NW state monitoring/management unit
30 Station
31 Result reception unit
32 Control unit 33 Optical NW device
34 ACK transmission unit
35 Optical transport path measurement unit
50 Computer
51 Communication request transmission unit
52 ACK reception unit
53 Wavelength tunable transceiver
54 Calculation unit 54
300 Optical transport network
310 Optical transport path
901 CPU
902 Memory
903 Storage
904 Communication device
905 Input device
906 Output device

The invention claimed is:

1. An optical transport system comprising: a plurality of nodes constituting an optical transport network; a first computer and a second computer that perform communication via the optical transport network; and an orchestrator connected to the plurality of nodes and the first computer and the second computer, wherein
the first computer includes
a transmission unit, including one or more processors, configured to transmit a communication requirement related to communication with the second computer to the orchestrator, and
a first reception unit, including one or more processors, configured to receive a setting completion notification of an optical path constructed in the optical transport network from the orchestrator, and
the orchestrator includes
a second reception unit, including one or more processors, configured to receive the communication requirement from the first computer,
a first calculation unit, including one or more processors, configured to determine an optical path to be used for the communication based on the communication requirement and a transport quality of an optical transport path of the optical transport network, and calculate setting information to be set to an optical network device of each of the plurality of nodes to construct the optical path, wherein the transport quality comprises non-linear effects including interphase modulation and four-wave mixing depending on a wavelength in use,
a first transmission unit, including one or more processors, configured to transmit the setting information to the optical network device to each of the plurality of nodes, and
a second transmission unit, including one or more processors, configured to transmit the setting completion notification to the first computer after receiving a setting completion response of the setting information from the plurality of nodes,
each of the plurality of nodes includes
a measurement unit, including one or more processors, configured to measure the transport quality of the optical transport path of the optical transport network and transmit the transport quality to the orchestrator,
a third reception unit, including one or more processors, configured to receive the setting information to the optical network device of a local node from the orchestrator,
a setting unit, including one or more processors, configured to set the setting information to the optical network device of the local node, and
a third transmission unit, including one or more processors, configured to transmit the setting completion response to the orchestrator after completing setting of the setting information;
wherein the first calculation unit of the orchestrator is configured to determine an optical path in a communication section between the first computer and the second computer such that a single optical path is selected in a communication section where a communication bandwidth included in the communication requirement can be satisfied with a single optical path, and a plurality of optical paths is selected in a communication section where a single optical path cannot satisfy the communication bandwidth until the communication requirement is satisfied.

2. The optical transport system according to claim 1, wherein the orchestrator further includes a second calculation unit, including one or more processors, configured to calculate a task completion time required to complete a task of the communication based on the optical path.

3. An orchestrator that is connected to a plurality of nodes constituting an optical transport network and connected to a first computer and a second computer that perform communication via the optical transport network, the orchestrator comprising:
a reception unit, including one or more processors, configured to receive a communication requirement related to communication with the second computer from the first computer;
a calculation unit, including one or more processors, configured to determine an optical path to be used for the communication based on the communication requirement and a transport quality of an optical transport path of the optical transport network, and calculate setting information to be set to an optical network device of each of the plurality of nodes to construct the optical path, wherein the transport quality comprises non-linear effects including interphase modulation and four-wave mixing depending on a wavelength in use, and
a first transmission unit, including one or more processors, configured to transmit the setting information to the optical network device to each of the plurality of nodes;
a second transmission unit, including one or more processors, configured to transmit a setting completion notification of the optical path constructed in the optical transport network to the first computer after receiving a setting completion response of the setting information from the plurality of nodes;
wherein the calculation unit is configured to determine an optical path in a communication section between the first computer and the second computer such that a single optical path is selected in a communication section where a communication bandwidth included in the communication requirement can be satisfied with a single optical path, and a plurality of optical paths is selected in a communication section where a single optical path cannot satisfy the communication bandwidth until the communication requirement is satisfied.

4. A control method for an optical transport network performed by a plurality of nodes constituting the optical transport network, a first computer and a second computer that perform communication via the optical transport network, and an orchestrator connected to the plurality of nodes and the first computer and the second computer, the control method comprising:

by the first computer, transmitting a communication requirement related to communication with the second computer to the orchestrator;

by the orchestrator, receiving the communication requirement from the first computer;

determining an optical path to be used for the communication based on the communication requirement and a transport quality of an optical transport path of the optical transport network, and calculating setting information to be set to an optical network device of each of the plurality of nodes to construct the optical path, wherein the transport quality comprises non-linear effects including interphase modulation and four-wave mixing depending on a wavelength in use, wherein the optical path is determined such that, in a communication section between the first computer and the second computer, one optical path is selected in a communication section in which a communication bandwidth included in the communication requirement can be satisfied with one optical path, and a plurality of optical paths are selected in a communication section in which the communication bandwidth cannot be satisfied with one optical path until the communication requirement is satisfied;

transmitting the setting information to the optical network device to each of the plurality of nodes;

by each of the plurality of nodes, receiving the setting information to the optical network device of a local node from the orchestrator;

setting the setting information to the optical network device of the local node;

transmitting a setting completion response of the setting information to the orchestrator after completing setting of the setting information;

by the orchestrator, transmitting a setting completion notification of the optical path constructed in the optical transport network to the first computer after receiving the setting completion response from the plurality of nodes; and by the first computer, receiving the setting completion notification from the orchestrator.

5. A non-transitory computer-readable storage medium storing control program causing a computer to execute the control method according to claim 4.

* * * * *